Figure 1:
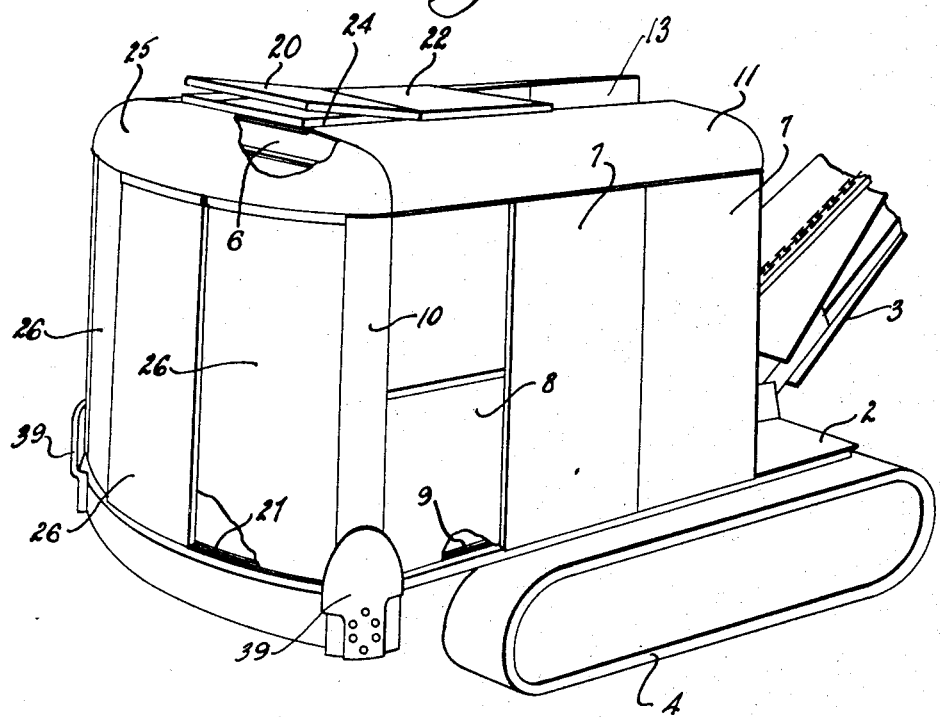

July 25, 1933.　　　　T. F. STRINGER　　　　1,919,387
CAB
Filed May 26, 1931　　　3 Sheets-Sheet 1

INVENTOR
THOMAS F. STRINGER
BY
Buckett, Hyde, Higley & Mayer
ATTORNEYS

July 25, 1933. T. F. STRINGER 1,919,387
CAB
Filed May 26, 1931 3 Sheets-Sheet 3

INVENTOR
*Thomas F. Stringer*
BY
*Brockett, Hyde, Higley & Meyer*
ATTORNEYS

Patented July 25, 1933

1,919,387

UNITED STATES PATENT OFFICE

THOMAS F. STRINGER, OF ELYRIA, OHIO, ASSIGNOR TO THE THEW SHOVEL COMPANY, OF LORAIN, OHIO, A CORPORATION OF OHIO

CAB

Application filed May 26, 1931. Serial No. 540,081.

My invention relates to a cab and, particularly to a cab of the type adapted to be mounted on the operating mechanism supporting framework of an excavator or moving crane to cover the power unit and operating mechanism thereof and to provide a protection for the excavator or crane operator.

The invention contemplates the provision of a cab that advantageously differs or distinguishes over previous similar structures in that a greater door area of the cab walls can be provided and the doors so positioned as to permit visibility into the cab or permit the operator to see out of the cab at a plurality of different points when such doors are open and likewise advantageously differs over previous similar structures in that a very small amount of the inside room of the cab is sacrificed by opening the doors and the over-all size, particularly the width, is not increased in such positioning of the walls.

Heretofore, doors have been provided in the side walls adapted to swing outwardly and against another portion of the side wall of the cab and be latched in such position whereby the over-all size of the cab would be increased by the thickness of each door opened with the result that clearance space provided had to be correspondingly greater. Such outwardly swinging doors have the further undesirable feature of hiding or cutting off the usual advertising space on the outside of the cab while, at the same time, requiring a bracing of the cab structure of such nature as to cause the number of doors used to be limited with a consequent reduction in visibility for the operator as well as ventilation. It is well understood that the cab covers the power unit and operating mechanism for the structure and the heat from the power unit and clutches practically necessitates proper ventilation thereof due to the fact that an operator is usually therein for controlling the operation of the machine as a whole.

One object of my invention is to provide a cab with means for providing a large amount of door openings in the side walls to increase the visibility of the operator and ventilation of its cab without increasing the over-all size or sacrificing but very little, if any, of the inside space. This is accomplished by providing doors that slide to open and closed position along the side walls of the cab, accordion doors and doors that swing inwardly at the front of the cab, and a plurality of doors at the rear of the cab that are movable into nesting relation whereby a maximum of two-thirds of the rearward end of the cab may be opened if desired, all of such doors being disposed on the inside of the cab when in open position or within the greatest normal over-all area of the cab.

Another object of my invention is to provide a plurality of doors at the rearward end of a cab which may be moved into nesting relation, may be easily entirely removed without affecting the remainder of the cab structure, and are adjustable so as to be used on cabs of different heights, as well as the provision of a locking means for securing the doors in any position of nested or unnested relation.

Still another object of my invention is to provide a cab embodying maximum strength and yet a minimum of size whereby the least amount of outside clearance possible will be required for the cab and to provide a bumper means for preventing injury to the rearward end of the cab.

Figures 2, 3:
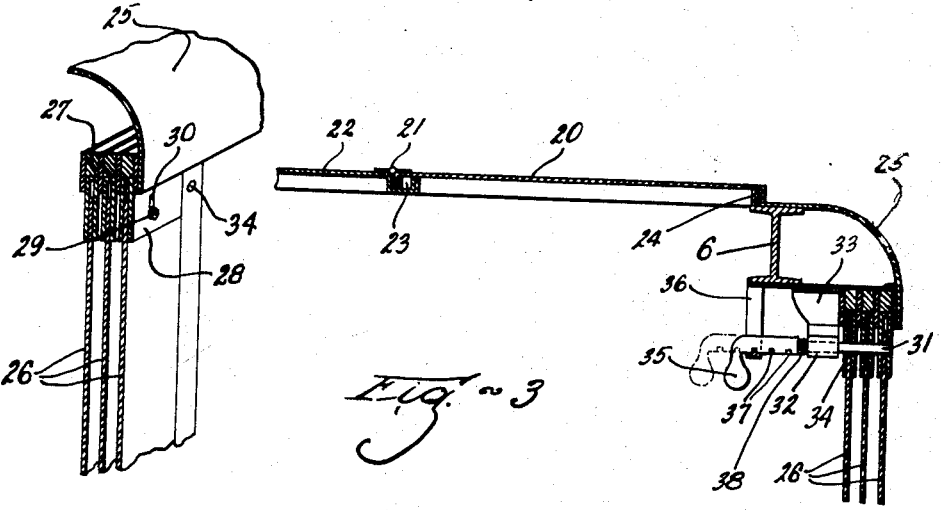
Figure 4:
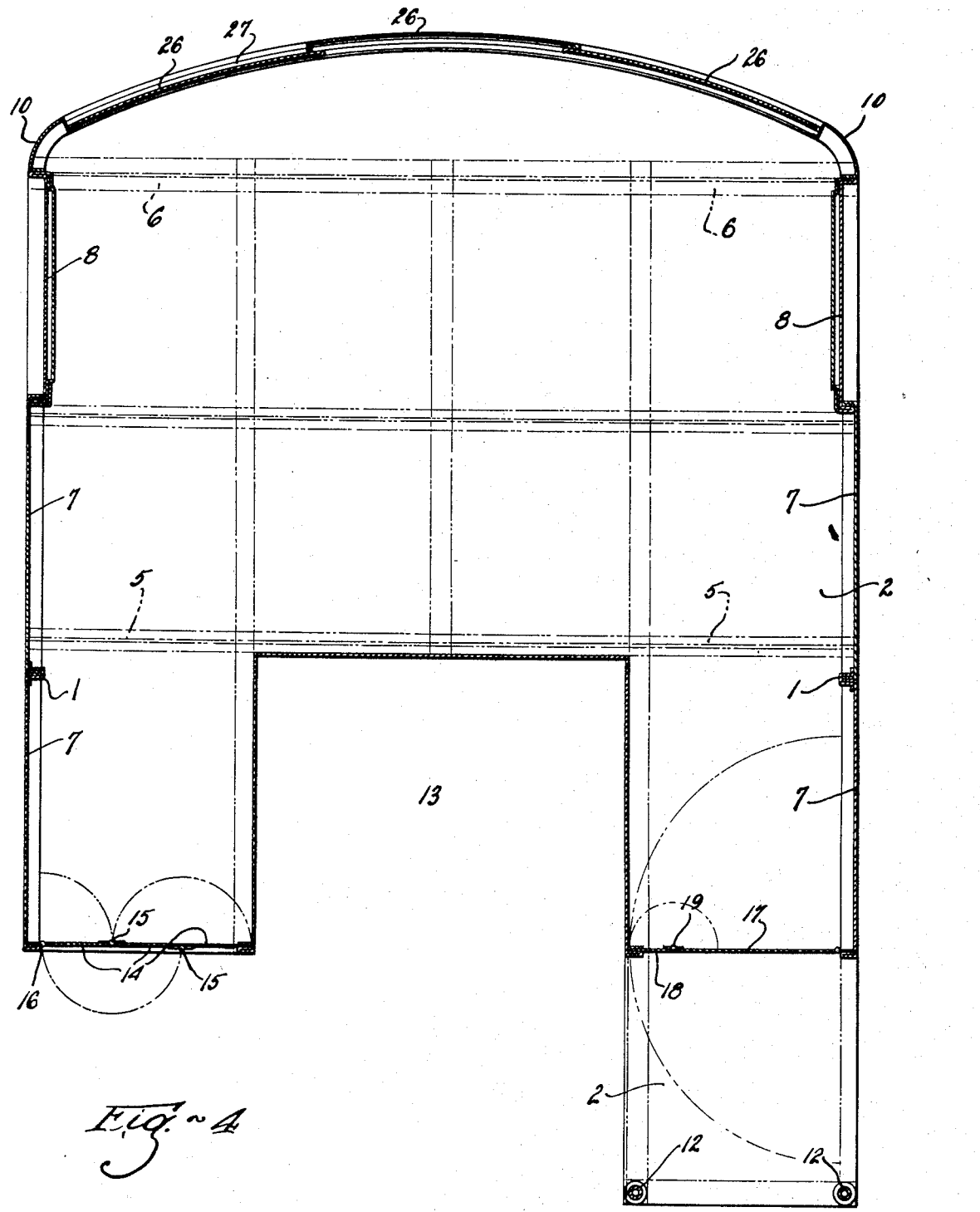
Figures 5, 6:
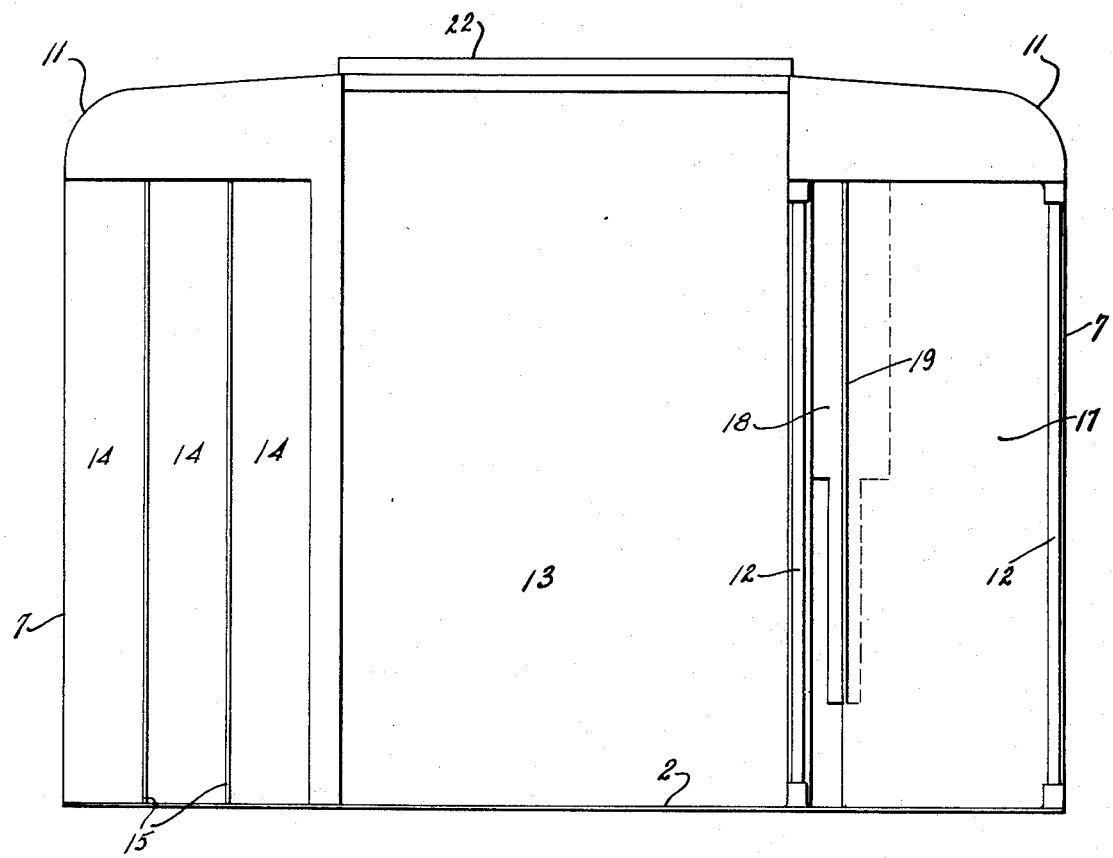

Various other objects and advantageous features of my invention will be seen in the following description and one embodiment thereof may be seen in the accompanying drawings wherein similar characters of reference designate corresponding parts, and wherein:

Fig. 1 is a perspective view showing a cab constructed in accordance with my invention; Fig. 2 is a perspective view, partly in section, showing the rear end doors of the cab in nested relation and their adjustability; Fig. 3 is a sectional view showing the doors in nested relation, the locking means therefor, and the roof hatch provided on the cab; Fig. 4 is a sectional plan view of the cab shown in Fig. 1; Fig. 5 is a front end view of the cab; and Fig. 6 is a perspective view, partly in section, showing the side door of the cab.

Referring to the drawings, I have shown the preferred embodiment of my invention as consisting of a cab which, in this instance, is all metallic and embodies suitable uprights 1 extending upwardly from the operating mechanism supporting floor or base 2 of an excavator or crane structure including the usual boom 3 and traction elements 4. Suitable longitudinal and laterally disposed members 5 form a roof supporting net-work, the longitudinal cross members being bound together at the rearward end of the cab by a girt 6.

In accordance with my invention, each side wall of the cab consists of one or a number of fixed metal panels 7 disposed side by side and a door 8 which is slidable into and out of closed and open position. Of course, the two panels 7 may be separated with the door in between if such construction is desired. As shown, the door 8 consists of a metal panel that is suitably braced and supported and such door is mounted to slide into and out of nesting relation with one of the panels 7 by being mounted in tracks 9, one at the top and one at the bottom of the cab. Any suitable form of track may be employed as well as any suitable means for locking these doors in place. The door 8 in open position nests with the panel 7 on the inner side thereof as shown.

Rounded corner posts 10 which give a maximum strength for the size thereof and provide cupboard space for tools or other articles form the corner supports for the rearward end of the cab and as a partial support for the framework made up of the members 5 and girt 6 that supports a roof structure of panels 11, the roof structure being rounded off at its opposing sides to provide maximum clearance for the excavator or crane structure. As shown, the forward end of the cab extends further outwardly at the left-hand side of the cab looking toward the front thereof than it does at the right-hand side, the roof panel on the left-hand side being supported by two upright members or posts 12. The cab is also so formed as to provide a rectangular space 13 that may be closed in as much as possible by suitable panels in which parts of the operating machinery, cables, etc., may be connected to the operating mechanism. To have the cab extend forwardly further on one side than on the other provides what may be termed as a cut-off which eliminates the blind spot on the right-hand side of the cab which would otherwise be present to an operator located in the forward extending portion of the cab on the left-hand side.

On the right-hand side of the cab, the front opening is adapted to be closed by a plurality of relatively narrow doors 14 interhinged with each other as at 15 and to the side wall of the cab as at 16 to form what is known as an accordion door whereby the relatively narrow doors may be nested together on the inside of the cab and adjacent the front end thereof. This is shown in Fig. 4. Thus, a maximum amount of door closure with a minimum amount of space taken up by the door when in open position is provided, the nested doors being on the inside of the cab.

At the left-hand side of the front end of the cab, a hinged inwardly swinging door 17 is provided, the door being adapted to swing inwardly and be disposed along the inner side of one of the panels 7 when in open position. This door does not extend entirely to the door jamb at one side but is provided with a flap 18 hinged to the main body portion of the door 17 as at 19 whereby the flap may be swung inwardly through an arc of 180° whereby the door 17 will pass through the door casing and may be attached to one of the posts 12 to form a side protection for the crane or excavator operator at the controls of the machine. However, in either position, opening of the door 17 does not increase the over-all size of the cab, the door being disposed within the greatest normal area of the cab when in either position.

As shown in Figs. 1 and 3, the roof structure for the cab embodies a roof hatch 20 that may be swung to open or closed position about a hinge 21, the panel 22 to which the roof hatch is hinged being provided with a trough 23 at the hinge point of the hatch to provide means for draining off any water that might enter the crack between the hatch and panel at the hinge point therebetween. However, the hatch may be slidingly mounted on the roof if desired. The outer edges of the hatch 20 are adapted to fit over an upwardly extending flange 24 in order to provide a tight fit between the roof hatch and the roof panels and to prevent leakage of water into the cab at this point. Such roof hatch provides a means in addition to any exhaust pipe means extending to the outer side of the house or cab for permitting the escape of heat and gases from the power unit disposed within the cab and the heat from the clutches also disposed therein.

Further, in accordance with my invention, the rearward end of the cab roof is rounded off as at 25, such rounded portion extending outwardly from the girt 6, and the rearward end of the cab is rounded to form a continuation of the arcs formed by the outer surfaces of the rounded corner posts 10 whereby greater cab clearance is provided. Such rearward end of the cab is closed by a plurality of doors 26, in this instance three, that extend substantially the entire heighth of the cab and are adapted to be moved into nested relation to open any one-third or two-thirds of the rearward end of the cab. Each door 26 slides in a set of tracks 27 individual to each door, one track being at the top and one at the bottom and the sets of tracks being disposed side by side. With this construction, as shown in Fig. 4, the doors 26 may be moved into nested relation with the center door always at the outside. Thus, a constant space which may be used for advertising is provided as is also true of the side panel 7 hereinbefore described.

In order to entirely remove the doors 26 from the tracks 27, the upper end of each door 26 is equipped with a U-shaped member 28 that is held thereon by means of bolts 29 extending through holes in the door 26 and vertical slots 30 in the U-shaped members 28. As shown, these U-shaped members 28 extend upwardly into the upper tracks 27 and may be raised or lowered to have the doors 26 of any desired heighth by loosening the bolts 29 and adjusting the position of the U-shaped members 28. Similarly, the doors may be entirely removed from the tracks 27 by loosening the bolts 30 and moving the U-shaped members 28 downwardly on the doors until the upper edge of the U-shaped members will pass beneath the lowermost edge of the tracks 27. As shown in Fig. 6, a like construction may be employed on the side doors 8. Thus, a plurality of doors are provided which, while not increasing the over-all size of the cab when in open position are easily entirely removable from the cab and are adjustable so as to be adapted for use in door openings of different heighths.

A suitable locking means is provided for locking rear doors 26 in any position, either closed or open, which takes the form of a bolt 31 that is slidable longitudinally through a supporting sleeve 32 that may be suspended from the framework in any desired manner as by means of the web 33 and is adapted to slide into and out of openings 34 in each door and at each opposite side edge thereof, the openings 34 being adapted to be brought into alignment when the side edges of two doors are in aligned position. A handle 35 that extends through a U-shaped strap or bracket 36 and has notches 37 thereon adapted to cooperate with a projection 38 at the lower end of the U-shaped member 36 is pivotally connected to the bolt 31 as at 38 whereby the handle 35 may be raised to disengage the notches 37 from the projection 38 and the bolt 31 either moved into aligned openings 34 in two or more of the doors to lock the doors in any given nested position or be moved out of such openings to unlock the doors whereby they may be moved relative to each other. Any number of such latching means may be provided and the latching means may take any desired form. As shown in Fig. 1, bumper pads 39 are removably mounted on the lower rear corners of the cab to protect the cab corners from injury. These pads are made removable so that they may be taken off when necessary to obtain additional clearance.

Referring to the drawings and the preceding description, it will be seen that I have provided a cab for the operating mechanism of a crane or excavator structure embodying numerous novel and advantageous features. For instance, I have provided a cab embodying a plurality of doors so locked as to give maximum visibility either into or out of the cab and to give maximum ventilation wherein the doors are of such structure and so mounted that the greatest normal overall area of the cab structure will not be increased when all of the doors are in open position. This is accomplished by sliding, accordion, and inwardly opening doors. At the same time, the doors are of a nature and so mounted that very little of the inside area of the cab is sacrificed when the doors are open. Further, I have provided a cab structure that gives the maximum inside space for a power unit and operating machinery while being so compact as to require only a minimum of clearance in movement of the cab during operation of the machine. This feature coupled with the maximum visibility and ventilation features is highly advantageous.

What I claim is:

A cab structure for a power shovel comprising a frame, a roof portion curved vertically at its two side edges and at its rearward edge, and curved in a horizontal plane at its rearward end, a plurality of sliding doors curved generally with the curvature of the rearward end of said frame and extending substantially from the top to the bottom of the cab, a plurality of sets of upper and lower tracks at the rearward end of said cab, there being a set of tracks for each curved door whereby said doors may be slidably moved individually of the others to a position to form a complete closure for the rearward end of the cab or moved to nested relation to provide openings of varying size, and means for adjusting the vertical length of said doors whereby they may be adapted to different sets of tracks and may be readily inserted or removed from a set of tracks.

THOMAS F. STRINGER.